United States Patent
Prunty et al.

(10) Patent No.: US 10,399,458 B2
(45) Date of Patent: Sep. 3, 2019

(54) TETHERED CHARGING/RE-CHARGING DRONE (TCR) ASSEMBLY SYSTEM

(71) Applicants: Lee C. Prunty, Naperville, IL (US); William M. Hoeg, Naperville, IL (US); Peter Zerillo, Naperville, IL (US); Stephen M. Faivre, Naperville, IL (US); Pinakin Desai, Naperville, IL (US)

(72) Inventors: Lee C. Prunty, Naperville, IL (US); William M. Hoeg, Naperville, IL (US); Peter Zerillo, Naperville, IL (US); Stephen M. Faivre, Naperville, IL (US); Pinakin Desai, Naperville, IL (US)

(73) Assignee: MEMES ASSOCIATES, LTD., Naperville, IL (US)

( * ) Notice: Subject to any disclaimer, the term of this patent is extended or adjusted under 35 U.S.C. 154(b) by 185 days.

(21) Appl. No.: 15/621,035

(22) Filed: Jun. 13, 2017

(65) Prior Publication Data
US 2017/0361721 A1    Dec. 21, 2017

Related U.S. Application Data

(60) Provisional application No. 62/350,877, filed on Jun. 16, 2016.

(51) Int. Cl.
*B60L 15/38* (2006.01)
*B60L 5/38* (2006.01)
(Continued)

(52) U.S. Cl.
CPC ............ *B60L 15/38* (2013.01); *B60L 5/38* (2013.01); *B60L 53/12* (2019.02); *B60L 53/16* (2019.02);
(Continued)

(58) Field of Classification Search
CPC ...... B60L 5/38; B60L 11/1818; B60L 11/182; B60L 11/1827; B60L 11/1837;
(Continued)

(56) References Cited

U.S. PATENT DOCUMENTS

| 7,784,570 | B2 * | 8/2010 | Couture | B25J 5/005 |
|---|---|---|---|---|
| | | | | 180/65.8 |
| 8,851,519 | B1 * | 10/2014 | Stevens | B60R 21/2338 |
| | | | | 102/531 |

(Continued)

FOREIGN PATENT DOCUMENTS

EP    2660949 A1 *  11/2013  ............ H01M 10/44

*Primary Examiner* — Atul Trivedi
(74) *Attorney, Agent, or Firm* — Justin Lampel

(57) ABSTRACT

A tethered charging and recharging (TCR) drone assembly system is provided. The TCR drone assembly system may be a nurse vehicle-based, a master/slave vehicle-based, a stationary structure and/or free standing TCR drone assembly system. The TCR drone assembly system is especially suitable for use on moving vehicles, for example, a self-propelled conventional type vehicle operated by an operator and/or autonomous or slave autonomous vehicle with no operator on board. The TRC drone assembly system may quickly couple and may deliver energy charges, recharges or other types of power propellants to vehicles while the vehicles are stationary or in motion. The assemblies are especially suitable for providing power to vehicles when only limited downtime of the vehicles is desired. The assemblies are suitable for use in, for example, the agricultural, construction, defense or other industries.

12 Claims, 8 Drawing Sheets

(51) Int. Cl.
    *B60L 53/16* (2019.01)
    *B60L 53/12* (2019.01)
    *B60L 53/35* (2019.01)
    *B60L 53/30* (2019.01)

(52) U.S. Cl.
    CPC ............... *B60L 53/32* (2019.02); *B60L 53/35* (2019.02); *B60L 2200/10* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01)

(58) Field of Classification Search
    CPC .. B60L 15/38; B60L 2200/10; Y02T 10/7005; Y02T 10/7072; Y02T 90/121; Y02T 90/122; Y02T 90/125; Y02T 90/128; Y02T 90/14
    USPC .......................................................... 701/22
    See application file for complete search history.

(56) References Cited

U.S. PATENT DOCUMENTS

| | | | | |
|---|---|---|---|---|
| 2008/0303617 | A1* | 12/2008 | Schmidt | F02N 11/10 335/156 |
| 2010/0235006 | A1* | 9/2010 | Brown | B60L 11/1833 700/286 |
| 2011/0175569 | A1* | 7/2011 | Austin | H01M 10/44 320/109 |
| 2011/0221387 | A1* | 9/2011 | Steigerwald | B60L 11/182 320/108 |
| 2012/0043935 | A1* | 2/2012 | Dyer | B60L 1/003 320/109 |
| 2012/0126747 | A1* | 5/2012 | Kiko | B60L 3/0069 320/109 |
| 2012/0233062 | A1* | 9/2012 | Cornish | B25J 11/00 705/39 |
| 2013/0035814 | A1* | 2/2013 | Boyer | B60L 50/66 701/22 |
| 2013/0064351 | A1* | 3/2013 | Urbon | A61B 6/4283 378/98.5 |
| 2013/0119928 | A1* | 5/2013 | Partovi | H02J 7/025 320/108 |
| 2014/0021918 | A1* | 1/2014 | Ichikawa | H01M 10/44 320/109 |
| 2014/0067660 | A1* | 3/2014 | Cornish | G06Q 20/145 705/39 |
| 2014/0081504 | A1* | 3/2014 | Smith | B63B 59/10 701/23 |
| 2014/0375272 | A1* | 12/2014 | Johnsen | B60L 53/14 320/136 |
| 2015/0136012 | A1* | 5/2015 | Williams | B63G 8/001 114/312 |
| 2015/0165922 | A1* | 6/2015 | Worley, III | A63J 1/00 320/108 |
| 2015/0224845 | A1* | 8/2015 | Anderson | B60G 17/019 701/37 |
| 2015/0255994 | A1* | 9/2015 | Kesler | H02J 5/005 307/10.1 |
| 2016/0087687 | A1* | 3/2016 | Kesler | H04B 5/0037 307/104 |
| 2017/0140349 | A1* | 5/2017 | Ricci | G06Q 20/102 |
| 2018/0201148 | A1* | 7/2018 | Donnelly | B60W 20/13 |
| 2018/0229852 | A1* | 8/2018 | Boss | B64C 39/024 |
| 2018/0304765 | A1* | 10/2018 | Newman | H01M 10/446 |
| 2018/0320402 | A1* | 11/2018 | Evans | E04H 14/00 |
| 2018/0364740 | A1* | 12/2018 | Collins | G05D 1/0684 |
| 2019/0039752 | A1* | 2/2019 | Venturelli | B60L 53/50 |

\* cited by examiner

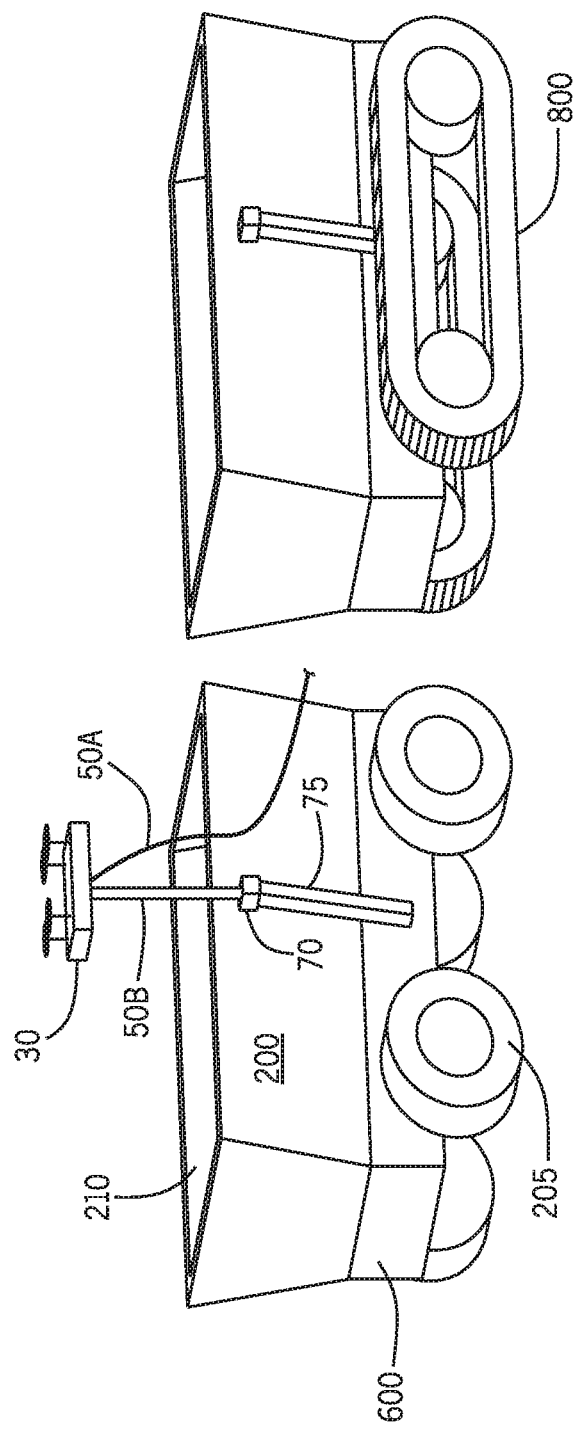

TETHERED CHARGING/RE-CHARGING DRONE (TCR) ASSEMBLY SYSTEM

CROSS-REFERENCE TO RELATED APPLICATIONS

The following application is based on and claims the priority benefit of U.S. provisional application Ser. No. 62/350,877 filed Jun. 16, 2016; the entire contents of which are incorporated by reference.

BACKGROUND OF THE INVENTION

A tethered charging and recharging (TCR) drone assembly system is provided. The TCR drone assembly system may be a nurse vehicle-based, a master/slave vehicle-based, a stationary structure and/or free standing TCR drone assembly system. The TCR drone assembly system is especially suitable for use on moving vehicles, for example, a self-propelled conventional type vehicle operated by an operator and/or autonomous or slave autonomous vehicle with no operator on board. The TRC drone assembly system may quickly couple and may deliver energy charges, recharges or other types of power propellants to vehicles while the vehicles are stationary or in motion. The assemblies are especially suitable for providing power to vehicles when only limited downtime of the vehicles is desired. The assemblies are suitable for use in, for example, the agricultural, construction, defense or other industries.

The TRC drone assembly system may be a single or may be a plurality of drones each tethered by a retractable cord/wire/tube/hose or any other structure which may transport power, electricity, light/lasers/or any spectrum of light, radio/sound frequencies, fluids, air/gasses, data and communication from the drones to the vehicles. In the embodiment utilizing a vehicle, the TCR drones may hover in full circumference of the vehicle it is tendering/nursing, providing automated coupling, measuring, power sources, replenishment, and data and visual confirmation/back-up/reporting of the vehicle it engages. In some embodiments, a mobile or stationary support station provides the source of the main products needed and/or used by the vehicles and may supply the desired liquids, foams, gases, powders, electrical power and/or electrical communication from the plurality of drones to the vehicles. A plurality of sensors located on the TCR drones may allow the drones to detect the needs and environmental conditions of the moving vehicles they are serving in real-time therein allowing the TCR drone to adjust to and optimize the vehicle's work cycles/function accordingly. The TCR drones may be controlled remotely by a user/operator or may be automatically controlled by sensors. In an embodiment, the TCR drones may have retractable/telescoping auto-coupling ports for delivering power/substance/product/data/etc. from any angle or direction of the vehicle the TCR drone is servicing.

Over the years, attempts have been made to incorporate drones into the agricultural industry. For example, U.S. Pat. No. 6,653,971 to Guice discloses a method and a system for detecting airborne plant material, such as mold spores and pollen, and flying insects and birds, and classifying them as to whether they are harmful to field crops, production animals or other assets within a protected volume or area. Lasers, radar, and other types of radiation may be used to illuminate at least a perimeter around such assets to be protected, with radiation returns detected and applied to a pattern classifier to determine whether the detected objects of interest are harmful, benign or beneficial. In the event the objects are determined to be harmful (pests), a variety of measures controllable via the radiation returns may be taken to eliminate the harmful objects, these measures including firing pulses of laser, microwave or other radiation of a sufficient intensity to at least incapacitate them, or mechanical measures such as controlled drone aircraft to macerate the pests with propellers or spray limited amounts of pesticide in the area of the pests.

U.S. Publication No. 20140316614 to Newman discloses a data collection system having a first computer media for collecting image data, a second computer media for analyzing the image data and locating anomalies in the image data, a third computer media for linking particular image data to address data of the property where the anomaly is present and a fourth computer media for generating a list of pertinent properties having similar anomalies by address. The image data collected by an unmanned aerial vehicle or drone.

However, these patents and publications fail to describe a TCR drone assembly as a servicing or nurse to the vehicles in operation for use in, for example, the agricultural, construction, defense or other industries where safety, downtime and timeliness is critical. Further, these patents and publications fail to describe a TCR drone assembly which has a plurality of drones tethered to retractable cord/wire/tube/hose or structures which can transport power, electricity, light/lasers/or any spectrum of light, radio/sound frequencies, fluids, air/gasses, and data providing real-time information on objects and environmental conditions surrounding the vehicles being serviced by the TCR drones.

SUMMARY OF THE INVENTION

A tethered charging and recharging (TCR) drone assembly system is provided. The TCR drone assembly system may be a nurse vehicle-based, a master/slave vehicle-based, a stationary structure and/or free standing TCR drone assembly system. The TCR drone assembly system is especially suitable for use on moving vehicles, for example, a self-propelled conventional type vehicle operated by an operator and/or autonomous or slave autonomous vehicle with no operator on board. The TRC drone assembly system may quickly couple and may deliver energy charges, recharges or other types of power propellants to vehicles while the vehicles are stationary or in motion. The assemblies are especially suitable for providing power to vehicles when only limited downtime of the vehicles is desired. The assemblies are suitable for use in, for example, the agricultural, construction, defense or other industries.

In some embodiments, the present mobile or stationary support station provides the source of the main products needed and/or used by the vehicles and may supply the desired power, electricity, light/lasers/or any spectrum of light, radio/sound frequencies, fluids, air/gasses, data, and communication through the plurality of drones. A plurality of sensors located on the TCR drones may allow the drones to detect the needs and environmental conditions of the moving vehicles they are serving in real-time allowing the TCR drone to therein adjust and optimize the vehicle's work cycles/function accordingly. The TCR drones may be controlled remotely by a user/operator or may be automatically controlled by sensors. In an embodiment, the TCR drones may have retractable/telescoping auto-coupling ports for delivering power/substance/product/data/etc. from any angle or direction of the vehicle the TCR drone is servicing.

An advantage of the present TCR drone assembly is that the present TCR drone assembly may have a plurality of sensors on the drones which provide real-time information and can actively engage mobile vehicles/living animals or beings and deliver power, product, video, data, or consequences to optimize performance or to condition behavior in situations where safety, downtime and compliance are critical.

Still further, an advantage of the present TCR drone assembly is that the present TCR drone assembly may allow a user to visually inspect for or for sensors to detect dangers that may place clients or patrons at risk and deliver product that will provide immediate protection and identification until the authorities arrive.

Still another advantage of the present TCR drone assembly system is that the present TCR drone assembly may be outside of the control of the FAA due to all the drones being tethered.

And an advantage of the present TCR drone assembly is that the present TCR drone assembly may be controlled remotely by a user or may be controlled automatically by sensors and/or pre-programmed computer instructions.

Still another advantage of the present TCR drone assembly is that the present TCR drone assembly may allow the plurality of drones to remain airborne almost in perpetuity as a result of the drones receiving and delivering power, electricity, light/lasers/or any spectrum of light, radio/sound frequencies, fluids, air/gasses, data and communication supply through the tethers.

Another advantage of the present TCR drone assembly is that the present TCR drone assembly may be used by, for example, painters, fire-fighters, farmers, construction workers, military personnel, police, riot police and etc.

Yet another advantage of the present TCR drone assembly is that the present TCR drone assembly may be used to deliver liquid building material, powdered building material, or a solid filament building material as well as power, electricity, light/lasers/or any spectrum of light, radio/sound frequencies, fluids, air/gasses, data and communication.

Yet another advantage of the present TCR drone assembly is that the target vehicles being charged may communicate their charge status back to the company's main command and control center so that the command and control center may decide the sequence in which the vehicles need to be charged. The mobile charging unit (HIVE) may then follow the sequence and prioritize the charging dictated by the command and control center.

For a more complete understanding of the above listed features and advantages of the present TCR drone assembly reference should be made to the detailed description and the detailed drawings. Further, additional features and advantages of the invention are described in, and will be apparent from, the detailed description of the preferred embodiments.

BRIEF DESCRIPTION OF THE DRAWINGS

FIG. 2 illustrates a close-up of a drone temporarily tethered to a target vehicle wherein the drone is charging the target vehicle and a second vehicle having tracks as opposed to wheels.

DETAILED DESCRIPTION OF THE PREFERRED EMBODIMENTS

Figure 1A:
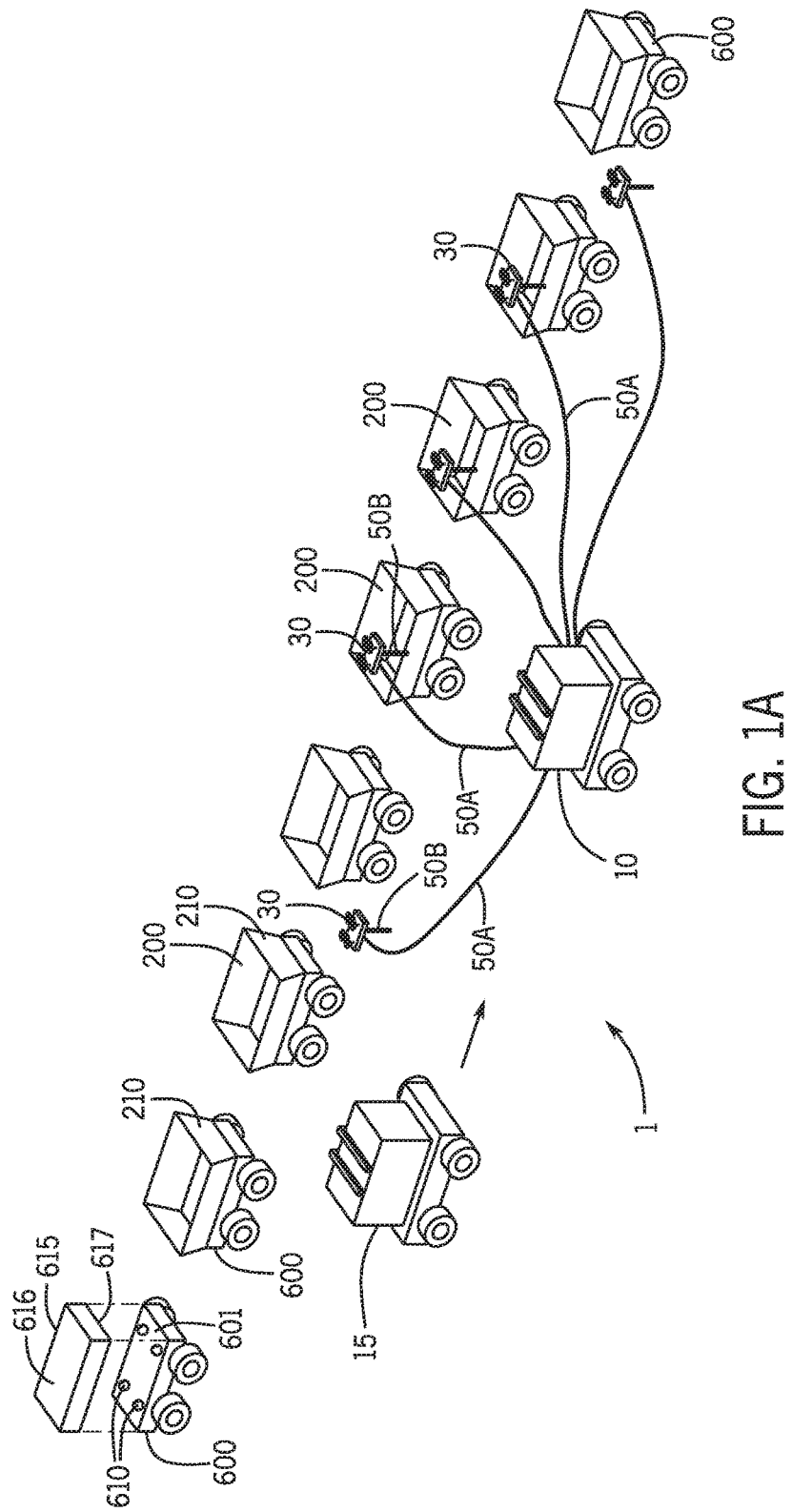
FIG. 1A illustrates a perspective view of a plurality of target vehicles being electrically recharged by a plurality of drones which are secured to a main HIVE vehicle.

A tethered charging and recharging (TCR) drone assembly system is provided. The TCR drone assembly system may be a nurse vehicle-based, a master/slave vehicle-based, a stationary structure and/or free standing TCR drone assembly system. The TCR drone assembly system is especially suitable for use on moving vehicles, for example, a self-propelled conventional type vehicle operated by an operator and/or autonomous or slave autonomous vehicle with no operator on board. The TRC drone assembly system may quickly couple and may deliver energy charges, recharges or other types of power propellants to vehicles while the vehicles are stationary or in motion. The assemblies are especially suitable for providing power to vehicles when only limited downtime of the vehicles is desired. The assemblies are suitable for use in, for example, the agricultural, construction, defense or other industries.

Referring first to FIG. 1, in an embodiment, a tethered drone assembly system is provided. The tethered drone assembly system may have, for example, a main High Intelligence Vehicle Ecosystem (or "HIVE") vehicle 10, a first tether 50A, at least one (flying) drone 30 and at least one target vehicle 200. The target vehicles 200 may have internal batteries which store power once charged. FIG. 1 illustrates numerous drones 30 and target vehicles 200; and it should be understood that the specific number of drones 30 and the specific number of target vehicles 200 which may be used in any specific system may vary depending on the needs of that system. In an embodiment, multiple tethers 50A and multiple drones 30 may be secured to a single main HIVE vehicle 10. The main HIVE vehicle 10 may be a movable charging apparatus capable of providing power to the target vehicles 200. Further, in an embodiment, the drones 30 may have cameras for visual inspection of the vehicles and surrounding area and may further have sensors for detecting hazards.

A plurality of second tethers 50B may be secured from the plurality of drones 30 to the target vehicles 200. The first tethers 50A and the second tethers 50B together may provide electrical power to the target vehicles 200. In particular, the main HIVE vehicle 10 may constantly be recharging the target vehicles 200 such that all or substantially all of the power needed to operate the target vehicles 200 comes from the main HIVE vehicle 10. As a result, the main HIVE vehicle 10 may constantly run along a long progression of target vehicles 200 and may charge them while the target vehicles 200 are moving. As a result, the target vehicles 200 and HIVE 10 may both remain constantly in motion. In an embodiment, the tethers 50A and 50B may also have a hollow interior passageway allowing the movement of liquids, powders, gases or the like in addition to the electrical energy which may be supplied to the target vehicles 200 through the tethers 50A, 50B.

In an embodiment, the system may utilize numerous main HIVE vehicles 10 such that as one main HIVE vehicle 10 may run out of energy a second main HIVE vehicle 15 (as illustrated in FIG. 1A) may move into place and may take over for the first main HIVE vehicle 10 (the process of which is shown in FIG. 1A) so that the first main HIVE vehicle 10 may itself be recharged at a remote location (not shown). As a result, the system allows for a continuous power supply to be available to the target vehicles 200. Although FIG. 1A shows the second main HIVE vehicle 15 without drones 30 attached for the purpose of making the drawings more clear, in the present system, the second main HIVE vehicle 15 would have drones 30 attached to it in the same manner as the first main HIVE vehicle 10.

Wheels 305 (FIG. 3) on the main HIVE vehicle 10 may allow the main HIVE vehicles 10 to move alongside the target vehicles 200 during simultaneous charging of the target vehicles 200. Preferably, the speed of the main HIVE vehicle 10 substantially matches the speed of the target vehicles 200 such that the tethers 50A, 50B do not accidentally disconnect. In an embodiment, the HIVE vehicle 10 may hook up (or sense) with the target vehicle 200 and may determine if the target vehicle 200 needs to be charged based on some predefined defined threshold (i.e. charge if energy level <30%, etc.).

Figure 1C:
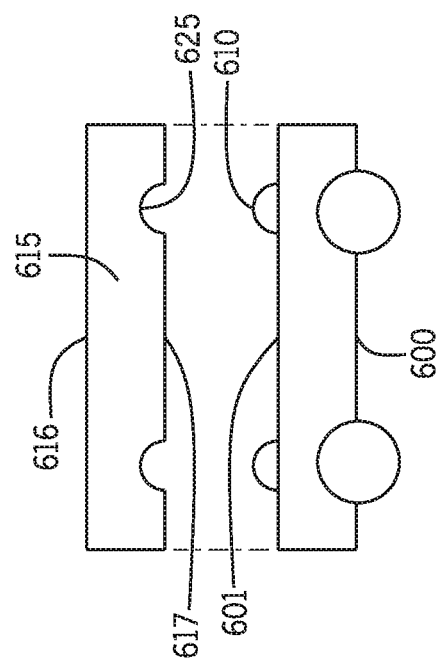
FIG. 1C illustrates a side view of an interchangeable top of all the vehicles.
Figure 1B:
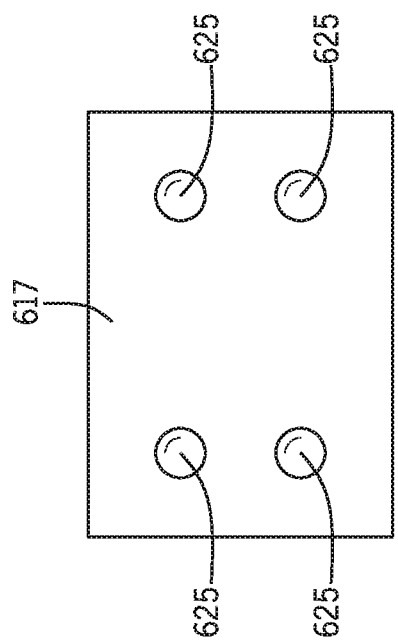
FIG. 1B illustrates the bottom of an interchangeable top of all the vehicles.

In an embodiment as illustrated in FIGS. 1A-1C, each of the target vehicles 200 may have interchangeable top(s). More specifically, instead of a holding bin 210 (as is shown in 7 of the 8 vehicles in FIG. 1), a platform 615, for example, may be utilized (as shown as the far-left vehicle of FIG. 1). The platform 615 may allow for loading and transporting larger and/or solid items. The platform 615 may have a top 616 and a bottom 617. On the bottom 617 of the platform 615, in one embodiment, may be a plurality of indentations 625 which may be aligned with a plurality of bumps 610 on the top surface 601 of a frame (or "base") 600 of the target vehicle 200 so as to temporarily secure the platform 615 to the top surface 601 by, for example, friction. It should be understood that any number of designs may be utilized in addition to a flat surface 615 or holding bin 210. More specifically, a single frame 600 may be interchangeably used hold the bin, flat surface, the charger 10, etc. Further, it should be understood that various other mechanisms may be used to hold the interchangeable tops to the frame 600, including, but not limited to, magnets, bolts, clamps or other securing mechanisms.

Figure 3:
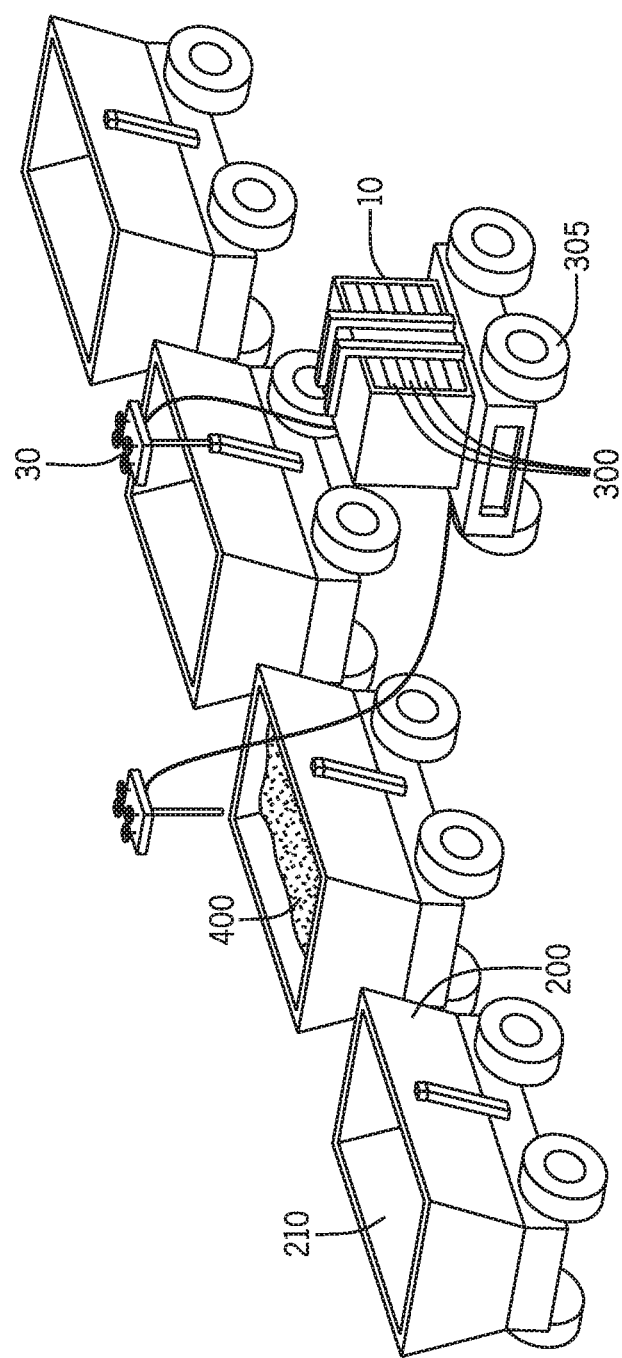
FIG. 3 illustrates a main HIVE vehicle running alongside a plurality of target vehicles wherein the main HIVE vehicle is recharging two of the target vehicles via drones.

Referring now to FIGS. 2 and 3, the plurality of target vehicles 200 may have, for example, a plurality of wheels 205 and, in an embodiment, a holding bin 210 for holding a crop, a mining product or other items. It should be understood that the target vehicles 200 may utilize a track system 800 (FIG. 2) and may have various other configurations other than a main holding bin 210 or flat platform 615 (as discussed above). The target vehicles 200 may be especially suitable to, for example, carry harvested crop 400 (FIG. 3) from a field, rocks from a quarry or any other suitable payload. The target vehicles 200 may further be used for an alternative function other that hauling, such as, for example, moving a lawn or planting seeds.

In an embodiment, the plurality of drones 30 may hover over the target vehicles 200 (in any direction) and may then drop the second tether 50B over the target vehicle 200. In an embodiment, magnets 70 (FIG. 2) on the tether 50B and magnets on the target vehicle 200 may automatically align the second tether 50B of the drones 30 to a charging port 75 on the target vehicle 200. In an embodiment, the charging port 75 itself may be magnetic. Once connected, power which flows from the main HIVE 10 (which may be generally a movable vehicle carrying a plurality of batteries 300) through the first tether 50A, then through the drones 30 (which elevates the tethers 50A), then through the second tethers 50B and finally provide power to the target vehicles 200. Alternatively, instead of housing batteries, the HIVE 10 may be a power generator. Once the charge is complete, the second tether 50B is disconnected from the target vehicle 200 and the drones 30 then hovers over another, uncharged or partially charged, target vehicle 200 and the process repeated. In particular, once the target vehicle 200 receives a full or desired charge, the polarity of the magnets 70 on either the tether 50B or the target vehicle 200 may be reversed so that the magnets 70 may be automatically disconnected and the tether 50B may move away from the target vehicle 200.

In an embodiment, a plurality of sensors on the drones 30 may provide real-time information as to the exact location of the drones, the main HIVE vehicle 10 and the target vehicles 200 so as to allow for accurate charging of the target vehicles 200. In an embodiment, the target vehicles 200 to be charged may communicate their charge status back to the company's main command and control center so that the command and control center may decide the sequence in which the target vehicles 200 need to be charged. The HIVE vehicle 10 may then follow the sequence and prioritize the charging dictated by the command and control center.

In an embodiment, the HIVE vehicle 10 may first follow the closest target vehicle 200 to the HIVE vehicle's 10 location, charge that target vehicle 200 and then move on to the next closest target vehicle 200 to the HIVE vehicle 10. This pattern may repeat up and down the line of target vehicles 200. A Round Robin scheme may also be employed in the charging of the target vehicles 200. In yet another embodiment of the system, the HIVE vehicle 10 may first charge the front most target vehicle 200 so that the front most vehicle may at least partially pull the other target vehicles 200 similar to a train. Charging the front most target vehicle 200 first may maintain the proper speed of an entire train of target vehicles 200 if the target vehicles 200 are connected.

Figure 6:
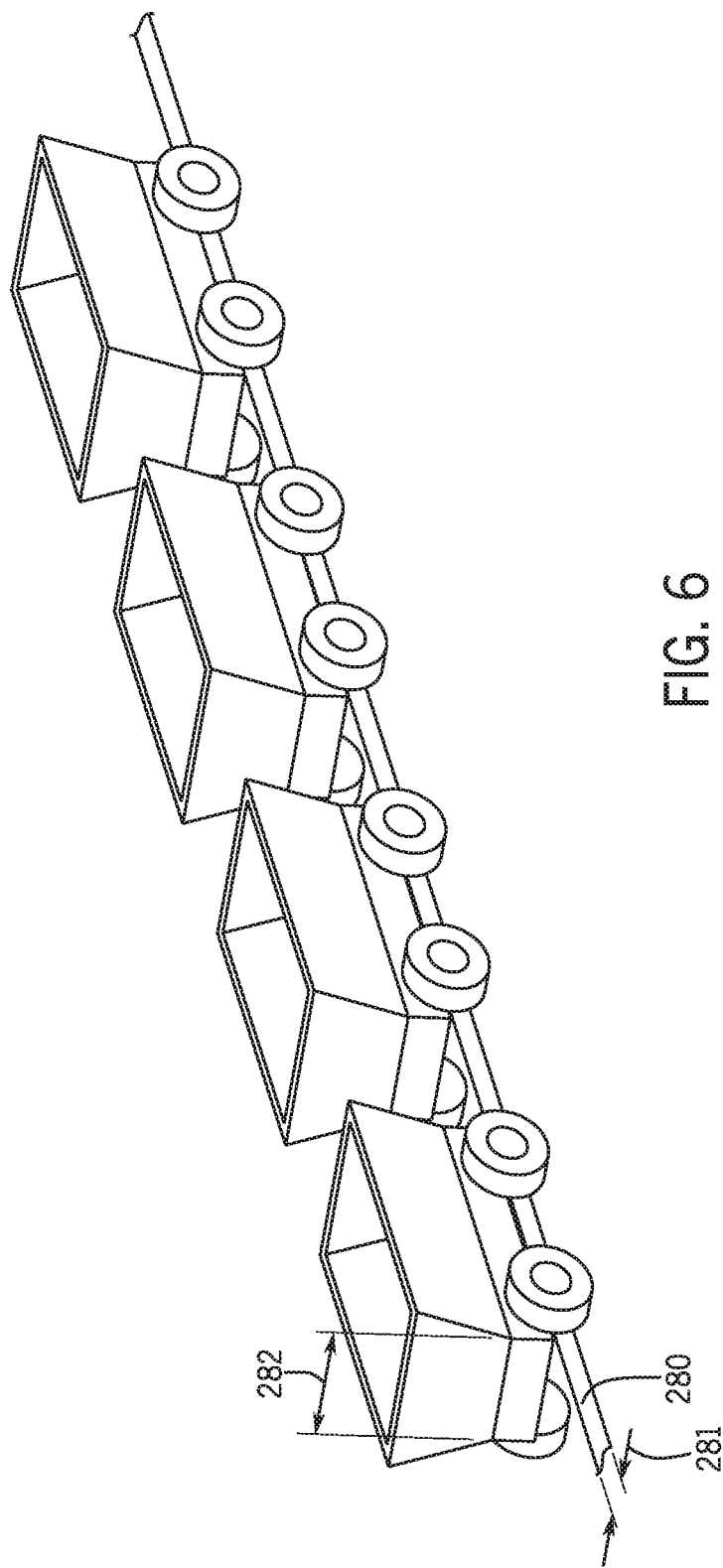
FIG. 6 illustrates an embodiment wherein the plurality of target vehicles are powered by passing over an electro-magnetic strip which powers the target vehicles from underneath the target vehicles.

Referring now to FIG. 6, in an alternative embodiment, the target vehicles 200 may run over an electro-magnetic power strip 280. The electro-magnetic power strip 280 may have a width 281 which is less than a width 282 of the target vehicles 200. The electro-magnetic power strip 280 may power the target vehicles 200. Ideally, the strip 280 is approximately a foot in width, but may be of any width.

In an alternative embodiment, the second tether 50B of the drone 30 may be equipped with inductive charging, using an electro-magnetic field to transfer energy between the drone 30 and the target vehicle 200. This may be accomplished, in one embodiment, without physical connection between the second tether 50B of the drone 30 and the target vehicle 200 and may allow a user to quickly switch the electro-magnetic field on or off. Utilizing inductive charging may help eliminate the second tether 50B from becoming accidentally entangled with the target vehicle 200 and pulling the drone 30 out of the sky. A sudden stop by either the HIVE vehicle 10 or the target vehicle 200 may pull on the second tether 50B in a traditional physical connection charging; whereas utilizing inductive charging may prevent damage to the HIVE vehicle 10, the target vehicle 200, the drone 30 and/or the tether 50B since there is no physical connection between the tether 50B and the target vehicle 200 and thus the tether 50B may easily be moved away from the target vehicle 200 in a sudden stop.

In still an alternative embodiment, the drone 30 may hover over the target vehicle 200 and may drop the tether 50B into a receptacle hole on the target vehicle 200 for charging. This charging may be similar to areal refueling as is common in military planes.

Figure 7A:
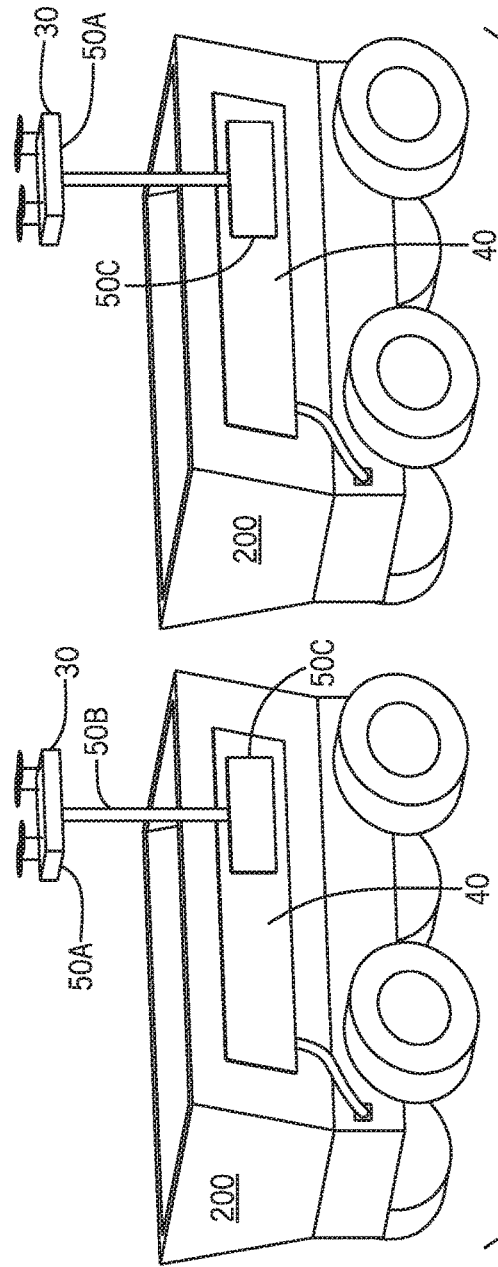
FIG. 7A illustrates a side view of a target vehicle being powered by the tethered drone assembly.
Figure 7B:
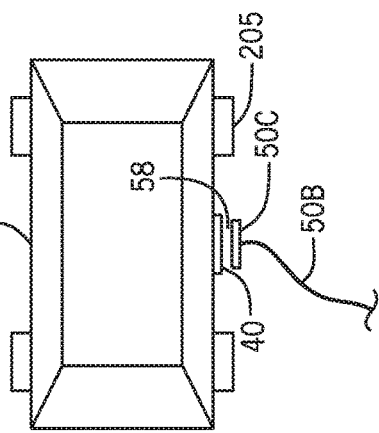
FIG. 7B illustrates a top view of the target vehicle being powered by the tethered drone assembly.

In an embodiment as illustrated in FIG. 7B a drop pad 50C may extend from the second tethered unit 50B of the drone 30. The drop pad 50C need not actually touch a charging pad 40 which may be located on the target vehicle 200 in an embodiment. In particular, in an embodiment, a space 58 may exist between the drop pad 50C of the drone 30 and the charging pad 40 of the target vehicle 200. Once in close proximity, the target vehicle 200 may receive power from the drop pad 50C of the drone 30.

Figure 4:
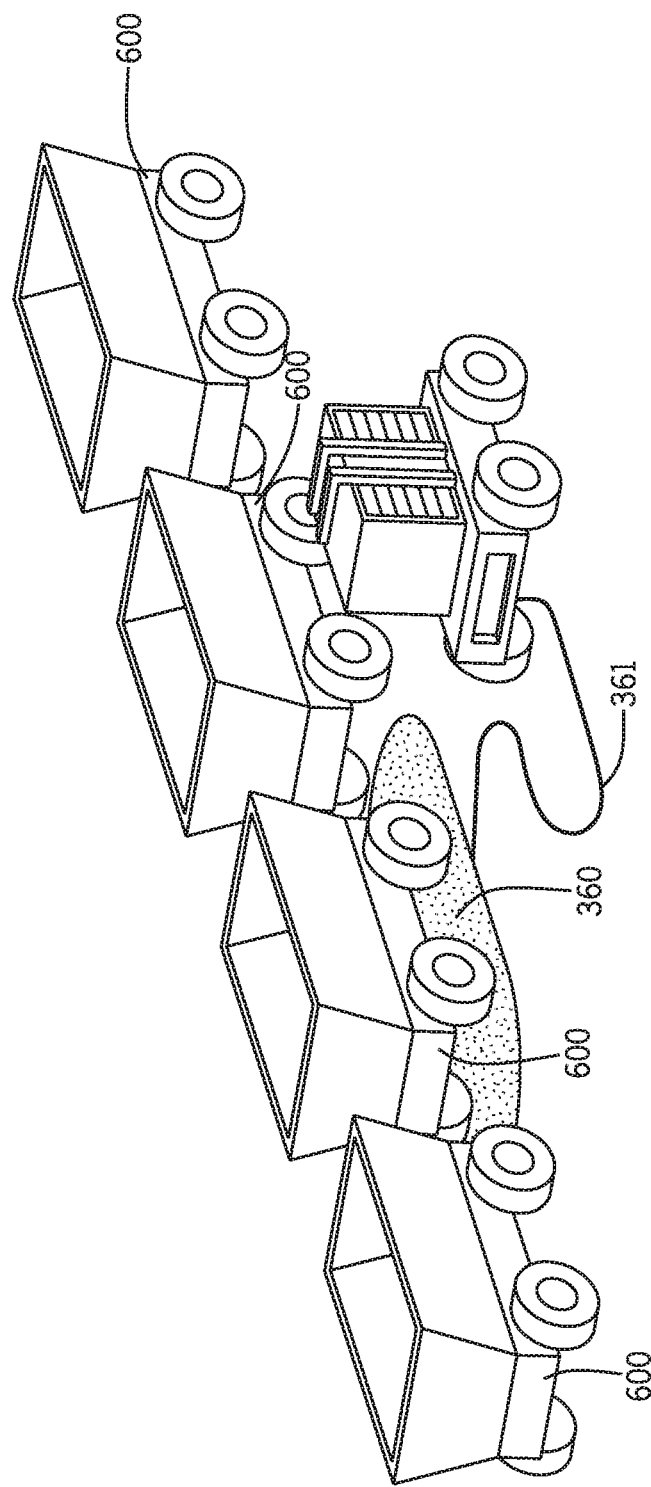
FIG. 4 shows an alternative embodiment wherein a charging pad is utilized on the target vehicles to charge the target vehicles as opposed to drones.

Referring now to FIG. 4, in an alternative embodiment, the target vehicles 200 may run over a generally flat receiving pad 360 (so that only the wheels of the target vehicle 200 touches the receiving pad 360) which is connected to the main HIVE vehicle 10 via a cord 361. In this embodiment, the drones 30 may not be needed. The receiving pad 360 may charge the target vehicles 200 by electro-magnetic induction. In an embodiment, the receiving pad 360 may be approximately 8 ft long; however, the receiving pad 360 may be of any suitable length.

Figure 5:
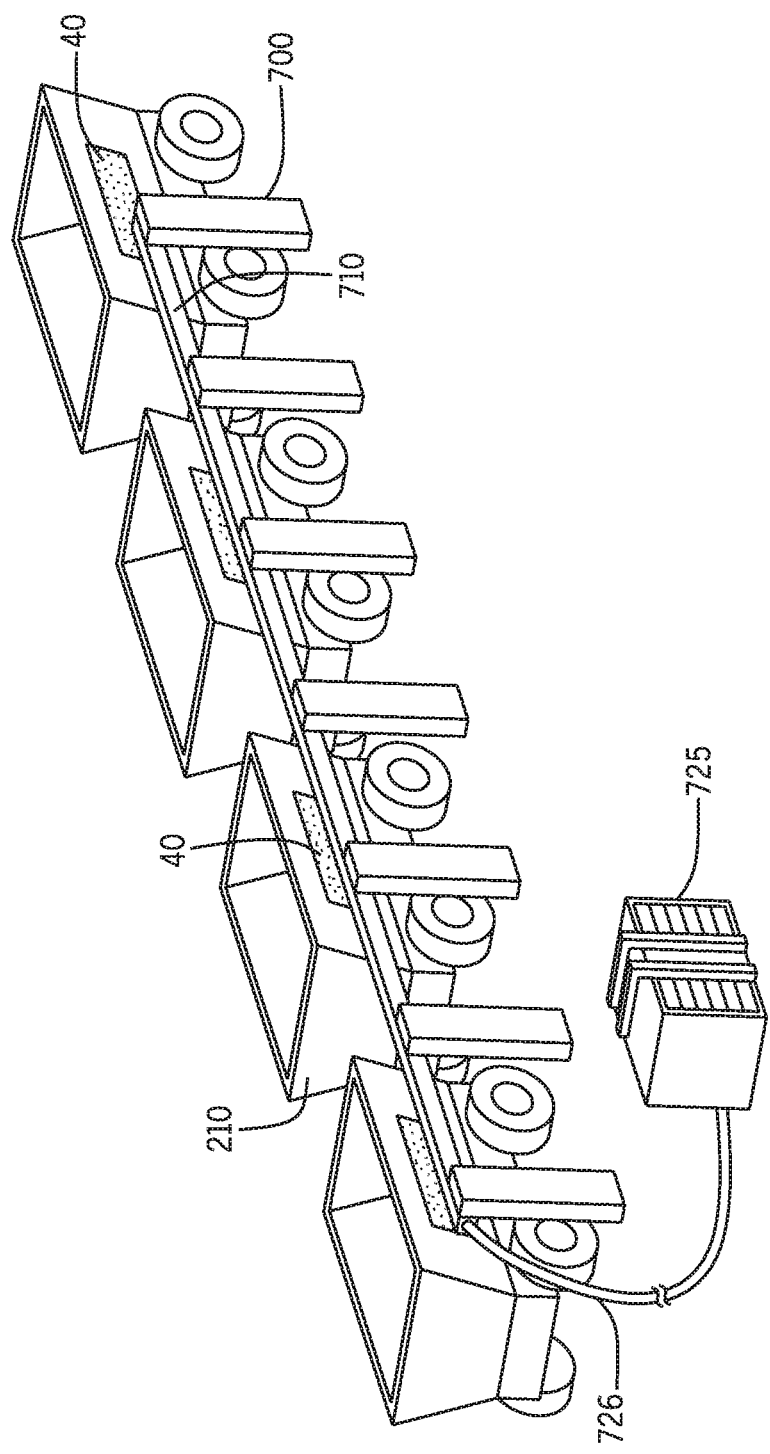
FIG. 5 illustrates an embodiment wherein a plurality of target vehicles are powered by an electro-magnetic rail which runs adjacent to the plurality of target vehicles as opposed to drones.

Referring now to FIG. 5, in an alternative embodiment, the target vehicles 200 may run alongside a rail system wherein the rail system has posts 700 and an electro-magnetic rail 710. The electro-magnetic rail 710 may be electrically connected, via a cable 726, to a generator 725. The rail system may not only act to electro-magnetically charge the target vehicles 200 (without toughing the target vehicles), but the rail system may also provide a back-up safety measure to prevent the vehicles 200 from accidentally getting off a desired path and causing personal injury or property damage.

In an embodiment, as shown in FIG. 5, a single rail system may be utilized. As a result, in an embodiment, the target vehicles 200 would be free to move freely within an enclosed area and then may return to the rail system for recharging. Thus, the rail system prevents movement of the target vehicles 200 outside of the enclosed area, but does not prevent movement of the target vehicles 200 inside the enclosed area. This is different from, for example, some amusement rides where the moving vehicles may utilize a charged rail but are bound to move along the rail system (and wherein the prior art also provides movement of the vehicles without stored power actually within the vehicle). In the present case, the rail system may be, for example, located along a perimeter of a rock quarry wherein the target vehicles 200 may charge at the rail, then return to the center of the bound rock quarry to perform work, and then return to the rail system for recharging. As stated above, the rail system also provides a safety measure to prevent property damage or personal injury from target vehicles 200 which might otherwise leave the bounded area without the rail system.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A tethered charging and recharging drone assembly system comprising:
   a first drone having a first tether which is tethered to a first movable charging apparatus wherein the first tether delivers an electrical charge from the first movable charging apparatus to the first drone;
   a second tether having a first end and a second end wherein the first end is electrically connected to the first drone and wherein the second end of the second tether is capable of supplying electrical power to a second vehicle;
   wherein the second tether is a flexible hose;
   a first magnet attached at the second end of the second tether;
   a second magnet attached to the second vehicle; and
   wherein the first magnet of the second end of the second tether is attracted to the second magnet of the second vehicle and wherein the first magnet of the second end of the second tether is capable of aligning the second tether to the second vehicle for supplying power to the second vehicle.

2. The tethered charging and recharging drone assembly system of claim 1 further comprising:
   a second drone tethered to the first movable charging apparatus wherein the second drone has a second tether having a first and a second end and wherein the second end of the second tether of the second drone is capable of providing an electrical charge a third vehicle.

3. The tethered charging and recharging drone assembly system of claim 1 wherein the second end of the second tether is capable of delivering an electrical charge to the second vehicle by utilizing an electro-magnetic field induction.

4. The tethered charging and recharging drone assembly system of claim 3 wherein the second end of the second tether does not physically touch the second vehicle while electrically charging the second vehicle.

5. The tethered charging and recharging drone assembly system of claim 1 further comprising:
   a second movable charging apparatus having tethered drones capable of delivering an electrical charge wherein the second movable charging apparatus replaces the first movable charging apparatus.

6. The tethered charging and recharging drone assembly system of claim 1 further comprising:
   a frame of the second vehicle wherein the frame of the second vehicle has an interchangeable top capable of carrying a load wherein the interchangeable top may be a holding bin, a flat surface or unit capable of delivering an electrical charge.

7. The tethered charging and recharging drone assembly system of claim 6 further comprising:
   at least one protrusion on a top of the frame of the second vehicle wherein the protrusion is temporarily inserted into a corresponding indentation on an underside of the interchangeable top and wherein the protrusion prevents the interchangeable top from moving or falling off the frame of the second vehicle.

8. The tethered charging and recharging drone assembly system of claim 1 further comprising:
   a tank track on the second vehicle capable of moving the second vehicle.

9. The tethered charging and recharging drone assembly system of claim 1 further comprising:
   a plurality of wheels on the second vehicle capable of moving the second vehicle.

10. The tethered charging and recharging drone assembly system of claim 1 wherein once the second vehicle receives a full or desired charge the polarity charge of the first magnet or the second magnet is reversed so that the magnets are automatically repelled and the second tether is released from the second vehicle.

11. A charging and recharging vehicle assembly system comprising:
- a first movable vehicle wherein the first movable vehicle is capable of carrying a load;
- a rail system wherein the rail system electrically charges the first movable vehicle when the first movable vehicle comes in close proximity with the rail system;
- wherein the electrical charging of the first vehicle by the rail system is through electro-magnetic induction with the first moving vehicle;
- wherein the rail system prevents movement of the first movable vehicle outside of a predesignated area by creating a physical barrier for preventing the movement of the first vehicle;
- a frame of the first movable vehicle wherein the frame of the first movable vehicle has an interchangeable top capable of carrying a load; and
- at least one protrusion on a top of the frame of the first movable vehicle wherein the protrusion is temporarily inserted into a corresponding indentation on an underside of the interchangeable top and wherein the protrusion prevents the interchangeable top from moving or falling off the frame of the first movable vehicle.

12. The charging and recharging vehicle assembly system of claim 11 wherein the first movable vehicle has a battery capable of storing electrical power after being charged.

* * * * *